United States Patent Office 3,813,371
Patented May 28, 1974

3,813,371
METHOD FOR CURING A FURFURYL
ALCOHOL BINDER
Keith B. Bozer and Lloyd H. Brown, Crystal Lake, Ill.,
assignors to The Quaker Oats Company, Chicago, Ill.
No Drawing. Filed Jan. 31, 1972, Ser. No. 222,337
Int. Cl. C08f 5/04
U.S. Cl. 260—88.5                               4 Claims

ABSTRACT OF THE DISCLOSURE

This invention relates to a process for curing a furfuryl alcohol binder with a specified acid salt of an aromatic amine, said binder useful for example in the preparation of fiber glass laminates.

BACKGROUND OF THE INVENTION

Furfuryl alcohol binders are extensively used in construction because of their excellent chemical resistance. However, the practical utilization of these binders with conventional polymerization catalysts such as mineral acid catalysts, e.g., sulfuric acid, hydrochloric acid, etc., has been plagued with processing difficulties. These difficulties include excessive exotherm and short pot life.

The above difficulties are partially overcome by use of "latent" or "placid" polymerization catalysts. One example of such teaching is U.S. Pat. No. 2,345,966 wherein the mineral acid salts of nitrogen containing organic compounds including amines such as aniline, etc., are taught as suitable "placid" polymerization catalysts to control exotherm and extend pot life.

Polymerization of furfuryl alcohol binders with "placid" catalysts such as aniline hydrochloride still results in excessive exotherms and too short pot lives for some applications. Hence, there is a need for a better "placid" catalyst than heretofore available.

SUMMARY OF THE INVENTION

It is an object of this invention to provide an improved method for curing furfuryl alcohol binders wherein the exotherm is controlled and the pot life is extended.

The objects of this invention are accomplished by a method for curing a furfuryl alcohol binder wherein the improvement comprises: admixing with said furfuryl alcohol binder a catalyst which is a reaction product of an acid selected from the group consisting of mineral acid and sulfonic acid, and an aromatic amine of the formula:

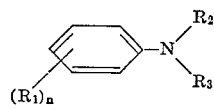

wherein $n$ is 0 to 5 inclusive, $R_1$ is chlorine, bromine, iodine or an alkyl group having 1 to 4 carbon atoms inclusive; when $n$ is 1 then $R_1$ may additionally be

when $n$ is 2 to 5 inclusive then two groups of $R_1$ which are ortho to each other may additionally be joined to form a benzene ring which is substituted with $(R_4)_m$ wherein $m$ is 0 to 4 inclusive; and $R_2$, $R_3$, and $R_4$ are independently hydrogen or an alkyl group having 1 to 4 carbon atoms with the further proviso that $R_2$ and $R_3$ are not both hydrogen. The catalyst should be present in an amount between 1 and 10 percent by weight based on the weight of the furfuryl alcohol binder. For hand lay up of fiber glass laminates, it is preferred that the catalyst be present in an amount between 2 and 7 percent based on the weight of the furfuryl alcohol binder.

For the longest pot life we prefer to use aromatic amines of the following formula:

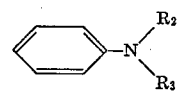

wherein $R_2$ and $R_3$ are defined as above.

It is to be understood that by furfuryl alcohol binder we mean those conventional binders which are commonly made by polymerizing furfuryl in the presence of an acid catalyst, usually with heat, until the desired degree of polymerization is achieved. Suitable acid catalysts include for example inorganic and organic acids such as hydrochloric acid, sulfuric acid, nitric acid, orthophosphoric acid, benzene sulfonic acid, toluene sulfonic acid, naphthalene sulfonic acid, benzoic acid, salicylic acid, acetic acid, propionic acid, maleic acid, oxalic acid, malonic acid, phthalic acid, lactic acid, and citric acid. Suitable acid catalysts also include Friedel-Crafts type catalysts such as ferric chloride, aluminum chloride, zinc chloride, and ammonium chloride. Suitable acid catalysts include organic acid anhydrides such as maleic anhydride, succinc anhydride, and glutaric anhydride. Examples of satisfactory conventional acid catalysts include mineral acid salts of urea, thiourea, substituted ureas such as methyl urea, acetyl urea, benzoyl urea, phenyl thiourea, etc.; mineral acid salts of other members of the urea system, e.g., guanidine, creatine, guanoline, etc.; mineral salts of ethanol amines such as mono-, di- and tri-ethanolamine; and mineral acid, salts of amines such as methyl amine, tri-methyl amine, aniline, benzylamine, morpholine, etc.

The resinification is generally stopped at an intermediate fluid stage, i.e., a viscosity at 26° C. between 300 and 5,000 centipoises, by the neutralization of the catalyst with a base to adjust the acidity. Within the range pH 5–8, the liquid resin is stable in storage for extended periods, and at the time of use, is recatalyzed with the above mentioned salts of the specified aromatic amines.

The novelty of our invention lies chiefly in the use of the above specified acid salts as catalysts in the curing of furfuryl alcohol binders. These acid salts unexpectedly provide cures with lower exotherms and longer pot lives. The acid salts used in this invention may be used in combination with the prior art acid catalysts when a shorter cure time is desired and the exotherm is controlled by cooling or can be tolerated.

Examples of acids which may be used in preparing the acid salts employed in our invention are the mineral acids, e.g., hydrochloric acid, hydrobromic acid, and hydroiodic acid; phosphoric acid, sulfuric acid, and nitric acid; and the sulfonic acids, e.g., benzene sulfonic acid, toluene sulfonic acid, and naphthalene sulfonic acid. These acids are reacted with an aromatic amine of the above formula. From about 50 percent to about 200 percent of the theoretical amount of acid necessary to neutralize the amine has been found satisfactory.

Suitable aromatic amines of the above formula for example include the following:

(a) Where $R_1$ is hydrogen, $R_2$ is an alkyl group having 1 to 4 carbon atoms inclusive and $R_3$ is hydrogen or $R_2$, N-ethylaniline
N,N-diethylaniline
N-isopropylaniline
N,N-diisopropylaniline
N-isobutylaniline
N,N-diisobutylaniline
N-t-butylaniline (b) Where $R_1$ is an alkyl group having 1 to 4 carbon atoms inclusive, $R_2$ is $R_1$, and $R_3$ is hydrogen or $R_1$, N-ethyl-*o*-toluidine
N,N-diethyl-*o*-toluidine
N-propyl-*o*-toluidine
N,N-dipropyl-*o*-toluidine
N-ethyl-*m*-toluidine
N-*sec*-butyl-*o*-toluidine
N,N-di-*sec*-butyl-*o*-toluidine
N,N-diethyl-*m*-toluidine
N-isopropyl-*m*-toluidine
N,N-diisopropyl-*m*-toluidine
N-*sec*-butyl-*m*-toluidine
N,N-di-*sec*-butyl-*m*-toluidine
N-ethyl-*p*-toluidine
N,N-diethyl-*p*-toluidine
N-isopropyl-*p*-toluidine
N,N-diisopropyl-*p*-toluidine
N-*sec*-butyl-*p*-toluidine
N,N-di-*sec*-butyl-*p*-toluidine
N-ethyl-*o*-ethylaniline
N,N-diethyl-*o*-ethylaniline
N-isopropyl-*o*-ethylaniline
N,N-diisopropyl-*o*-ethylaniline
N-*sec*-butyl-*o*-ethylaniline
N,N-di-*sec*-butyl-*o*-ethylaniline (c) Where two groups of $R_1$ are ortho to each other and are joined to form a benzene ring, $R_2$ is an alkyl group having 1 to 4 carbon atoms, inclusive, and $R_3$ is hydrogen or $R_2$, N-ethylnaphthylamine
N,N-diethylnaphthylamine,
N-isopropylnaphthylamine
N,N-diisoproylnaphthylamine
N-*sec*-butylnaphthylamine
N,N-di-*sec*-butylnaphthylamine
N-*t*-butylnaphthylamine (d) Where $R_1$ is

and $R_2$ is an alkyl group having 1 to 3 carbon atoms, inclusive and $R_3$ is hydrogen or $R_2$, N,N'-dimethylphenylenediamine
N,N'-diethylphenylenediamine
N,N'-diisopropylphenylenediamine
N,N'-di-*sec*-butylphenylenediamine
N,N'-di-*t*-butylphenylenediamine
N,N,N',N'-tetraethylphenylenediamine
N,N,N',N'-tetramethylphenylenediamine
N,N,N',N'-tetraisopropylphenylenediamine
N,N,N',N'-tetra-*sec*-butylphenylenediamine
N,N,N',N'-tetra-*t*-butylphenylenediamine (e) Where $R_1$ is chlorine, bromine, or iodine, $R_2$ is an alkyl group having from 1 to 4 carbon atoms inclusive, and $R_3$ is hydrogen or $R_2$, N-methyl-*o*-chloroaniline
N,N-diethyl-*p*-bromoaniline
N-isopropyl-*m*-iodoaniline
N,N-di-*sec*-butyl-*o*-chloroaniline
N-*t*-butyl-*p*-bromoaniline
N-methyl-2,4-dichloroaniline
N,N-diethyl-2,6-dibromoaniline
N-isopropyl-2,4-diiodoaniline
N,N-di-*sec*-butyl-2,4,6-trichloroaniline
N-*t*-butyl-2,4,6-tribromoaniline
N,N-di-*n*-butyl-2,4,6-triiodoaniline The acid salts useful in our invention may be added as solids or in the form of solutions to the furfuryl alcohol binder. It will be recognized that the catalyst might be added to the material to be bound and the binder then applied. To facilitate uniform distribution of the catalyst we prefer to admix the catalyst and binder and then apply this admixture to the material to be bound. Suitable solvents include water, methanol, and ethanol. It is preferred that the solution be concentrated inasmuch as it is undesirable to have unreactive and vaporizable material present in the unpolymerized binder.

Cure may take place at ambient temperature or may be accelerated by heating the catalyst and binder composition admixture to the initiation temperature of the particular acid salt of the substantial aromatic amine selected. The initiation temperature is that temperature where the heat of polymerization causes the catalyzed binder composition admixture to be at a higher temperature than that of an uncatalyzed binder composition subjected to identical programmed increases in temperature of a constant rate.

Furfuryl alcohol binders catalyzed by the method of this invention may be used in the formation of a wide range of composites. Suitable material for the formation of composites includes sand and fiber glass. It is to be understood that by "fiber glass" we mean all of the conventional forms used for reinforcement in standard fiber glass reinforced plastics. Suitable materials include for example chopped strand mat, woven roving, surfacing mat, chopped glass fiber, glass cloth, etc.

The fiber glass laminates prepared by the process of our invention have high structural strength, high chemical resistance, and fire resistance. They are substantially blister free and are useful wherever resistance to heat or chemicals and strength are important. For example, they are useful in industries where corrosion problems are severe including the chemical, fertilizer, dairy, waste treatment, and paper industries. Other applications include use in equipment used for storage, processing, and transfer of bulk materials and use in hoods, ducts, stacks, and scrubbers associated with exhaust systems which require a high degree of corrosion resistance and thermal stability.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

Example 1

This example is intended to illustrate a method of preparing an example of a suitable furfuryl alcohol binder for use in accordance with the invention: 4000 grams of furfuryl alcohol, 400 grams of water, and 8 grams of a 10 percent by weight solution of oxalic acid in water were charged into a 5 liter flask which was equipped with a heating mantle, a thermometer well, and a reflux condenser. The initial viscosity of the admixed contents of the flask was 43 seconds as measured by a Cenco paint consistency cup having a 3/32 inch aperture at the tip. The batch was heated for about 2 hours at reflux temperature until the viscosity was 47 seconds at which time 10 grams of 2,2',2''-nitrilotriethanol was added to neutralize the oxalic acid and adjust the pH to 6.0. The batch was distilled at a reduced pressure of 23mm. Hg for about 3 hours. The total distillate removed was 1122 grams containing about 7 percent by weight of furfuryl alcohol. The resultant furfuryl alcohol binder in the flask had a viscosity at 25° C. of about 700 centipoises.

Example 2

Using the furfuryl alcohol binder prepared in Example 1, Tests 1–6 inclusive were prepared. The principal purpose of these tests is to show that the specified acid salts of the above described aromatic amines can control the gel time of the furfuryl alcohol binder. For example, gel time may extend to more than 27 days (>40,000 minutes) at the 6 percent by weight catalyst level as shown in Table I. By proper choice of catalyst and catalyst level almost any cure cycle can be attained. The initiation temperatures reported in Table II are related to catalyst activity and reflect the temperature at which the catalyst initiates rapid polymerization. These values were determined by heating the test sample at a programmed rate and recording the temperature at which the heat of polymerization caused deviation from the programmed heated rate.

The gel time is a measure of pot life and is generally related to the catalyst level as might be expected. The gel time was taken to be that point when the binder was sufficiently polymerized that it would not flow when tilted in a cup and when touched would no longer transfer to the finger. These two conditions usually coincided.

Tests 1-6 were prepared by adding 6 percent by weight base on the weight of the binder of the type of catalyst indicated in Tables I and II below. Tests 2-6 are embodiments of our invention. Test 1 is not an embodiment of our invention but was prepared for the purpose of comparing with Tests 2-6 inclusive.

TABLE I

[Gel time in minutes at 28° C.]

| Test No. | Catalyst | Time |
|---|---|---|
| 1 | Aniline hydrochloride | 20 |
| 2 | N-methylaniline hydrochloride | >7,200 |
| 3 | N-ethylaniline hydrochloride | >7,200 |
| 4 | N-isopropylaniline hydrochloride | >7,200 |
| 5 | N,N-dimethylaniline hydrochloride | >40,000 |
| 6 | N,N-diethylaniline hydrochloride | >40,000 |

TABLE II

[Initiation temperatures as a function of catalyst at the 6 percent level]

| Test No. | Catalyst | Temp., °F. |
|---|---|---|
| 1 | Aniline hydrochloride | 80 |
| 2 | N-methylaniline hydrochloride | 155 |
| 3 | N-ethylaniline hydrochloride | 155 |
| 4 | N-isopropylaniline hydrochloride | 155 |
| 5 | N,N-dimethylaniline hydrochloride | 195 |
| 6 | N,N-diethylaniline hydrochloride | 265 |

The superior properties of the acid salts in Tests 2-6 inclusive as evidenced by extended gel time over aniline hydrochloride in Test 1 is not predictable on the basis of $pK_a$. Part of the data tabulated in Table I and II is retabulated in Table III below to demonstrate the lack of correlation with $pK_a$.

TABLE III

| Test No. | Amine | Gel time [1] | Initiation temp.[1] |
|---|---|---|---|
| 1 | Aniline | 4.63 at 25° C | 20 | 80 |
| 2 | N-methylaniline | 4.85 at 25° C | <7,200 | 155 |
| 3 | N-ethylaniline | 5.12 at 24° C | <7,200 | 155 |
| 5 | N,N-dimethylaniline | 5.15 at 25° C | <40,000 | 195 |
| 6 | N,N-diethylaniline | 6.16 at 22° C | <40,000 | 265 |

[1] At 6% catalyst level.

The cured binders in Tests 2-6 inclusive were substantially blister free indicating success in controlling the exotherm. If the exotherm had not been controlled the water produced during polymerization would have been excessively vaporized causing the cured binder to blister and when used to form a laminate causing the laminate to be weakened by the splitting of the laminate layers.

Example 3

The hydrobromic acid salt of N-ethylaniline was used at the 6 percent catalyst level as in Example 2. The gel time at 28° C. was 5700 minutes and the initiation temperature was 150° F. The exotherm was controlled inasmuch as no substantial blistering of the cured binder was observed.

Example 4

The orthophosphoric acid and p-toluene sulfonic acid salts of aniline; N-methylaniline; N-ethylaniline; N-iso- propylaniline; N,N-dimethylaniline; and N,N-diethylaniline were prepared and used as in Example 2. The salts of aniline had a shorter gel time and a greater exotherm than the other aromatic amines in this example. The use of the orthophosphoric and the p-toluene sulfonic acid salts of aniline does not constitute an embodiment of our invention but was tried for the purposes of comparison.

From the foregoing description we consider it to be clear that the present invention contributes a substantial benefit to the furfuryl alcohol binder art.

We claim:
1. A method for curing a furfuryl alcohol polymer wherein the improvement comprises; admixing with said furfuryl alcohol polymer a salt catalyst selected from the group consisting of mineral acid salts and sulfonic acid salts of an aromatic amine of the formula:

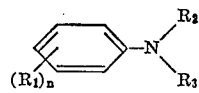

wherein $n$ is 0 to 5 inclusive, $R_1$ is chlorine, bromine, iodine or an alkyl group having 1 to 4 carbon atoms inclusive; when $n$ is 1 then $R_1$ may additionally be

when $n$ is 2 to 5 inclusive then two groups of $R_1$ which are ortho to each other may additionally be joined to form a benzene ring which is substituted with $(R_4)_m$ wherein $m$ is 0 to 4 inclusive; and $R_2$, $R_3$, and $R_4$ are independently hydrogen or an alkyl group having 1 to 4 carbon atoms with the further proviso that $R_2$ and $R_3$ are not both hydrogen, said catalyst being admixed in an amount between 1 to 10 percent by weight based on the weight of the furfuryl alcohol polymer; and heating the resulting catalyzed polymer composition to the initiation temperature of the catalyst.

2. The method as in claim 1 wherein the mineral acid salt is a member selected from the salt of hydrochloric acid, phosphoric acid, sulfuric acid, or nitric acid; the sulfonic acid salt is a member selected from the salt of benzene sulfonic acid or toluene sulfonic acid; the aromatic amine is of the formula:

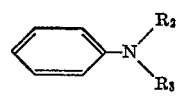

3. The process as in claim 1 wherein the catalyst is a member selected from the group consisting of N-methylaniline hydrochloride, N-ethylaniline hydrochloride, N-isopropylaniline hydrochloride, N,N-dimethylaniline hydrochloride, N,N-diethylaniline hydrochloride, and N-ethylaniline hydrobromide.

4. The process as in claim 1 wherein the catalyst is present in an amount between 2 and 7 percent by weight based on the weight of the furfuryl alcohol polymer.

References Cited

UNITED STATES PATENTS

| 2,345,966 | 4/1944 | Fiedler et al. | 260—88.5 |
| 3,597,386 | 8/1971 | Brabander | 260—88.5 |
| 2,698,319 | 12/1954 | Brown et al. | 260—88.5 |
| 2,813,846 | 11/1957 | Farber et al. | 260—88.5 |
| 3,070,551 | 12/1962 | Brown | 260—88.5 |
| 3,220,970 | 11/1965 | Carlström et al. | 260—88.5 |

HARRY WONG, JR., Primary Examiner

U.S. Cl. X.R.

117—124, 140, 161; 161—203